(12) United States Patent
Brenninger et al.

(10) Patent No.: US 8,967,342 B2
(45) Date of Patent: Mar. 3, 2015

(54) BRAKE MECHANISM FOR A VEHICLE

(75) Inventors: Martin Brenninger, Marktoberdorf (DE); Klaus Bayer, Marktoberdorf (DE)

(73) Assignee: AGCO GmbH, Marktoberdorf (DE)

( * ) Notice: Subject to any disclaimer, the term of this patent is extended or adjusted under 35 U.S.C. 154(b) by 190 days.

(21) Appl. No.: 13/119,711

(22) PCT Filed: Oct. 19, 2009

(86) PCT No.: PCT/EP2009/063674
§ 371 (c)(1),
(2), (4) Date: Mar. 28, 2011

(87) PCT Pub. No.: WO2010/046344
PCT Pub. Date: Apr. 29, 2010

(65) Prior Publication Data
US 2011/0186390 A1 Aug. 4, 2011

(30) Foreign Application Priority Data

Oct. 20, 2008 (DE) .......................... 10 2008 052 336

(51) Int. Cl.
*F16D 55/24* (2006.01)
*F16D 65/853* (2006.01)
*F16D 55/40* (2006.01)
F16D 121/02 (2012.01)
F16D 121/12 (2012.01)

(52) U.S. Cl.
CPC .............. *F16D 65/853* (2013.01); *F16D 55/40* (2013.01); *F16D 2121/02* (2013.01); *F16D 2121/12* (2013.01)
USPC .................... 188/264 E; 188/71.6; 192/70.12

(58) Field of Classification Search
CPC ............ F16D 2055/0058; F16D 13/74; F16D 13/648; F16D 25/123; F16D 55/40; F16D 65/853
USPC ........... 180/370, 372; 192/83, 219.4, 221, 90, 192/85.37, 85.39, 85.61; 188/71.5, 71.6, 188/105, 170, 264 B, 264 CC, 264 D, 264 E, 188/264 F
See application file for complete search history.

(56) References Cited

U.S. PATENT DOCUMENTS 1,380,584 A * 6/1921 Parker ........................ 188/264 E
2,873,826 A * 2/1959 Werner ...................... 188/264 E
(Continued)

FOREIGN PATENT DOCUMENTS

GB 1504073 A 3/1978
WO WO-2007017221 A 2/2007

OTHER PUBLICATIONS

International Search Report for International Appl. No. PCT/EP2009/063674 dated Dec. 22, 2009.

*Primary Examiner* — Bradley King
*Assistant Examiner* — Stephen Bowes

(57) ABSTRACT

The invention relates to a brake mechanism (1) for agricultural utility vehicles. In the case of the brake mechanism (1), during a brake application an additional quantity of oil is supplied to a brake chamber (150) via an inlet manifold (180), which is fluidically connected to an oil chamber (130). The service brake is formed so that, when the service brake is operated, a first control element (120) is moved towards the brake elements (140, 141) in such a way that a brake chamber (150) is fluidically connected to the inlet manifold (180) and thus ensures an additional oil supply from the oil chamber (130).

3 Claims, 2 Drawing Sheets

(56) References Cited

U.S. PATENT DOCUMENTS

| | | | |
|---|---|---|---|
| 2,928,511 A * | 3/1960 | Helvern et al. | 188/264 E |
| 3,202,253 A * | 8/1965 | Bolster et al. | 192/113.36 |
| 3,927,737 A * | 12/1975 | Prillinger et al. | 188/106 F |
| 3,941,219 A * | 3/1976 | Myers | 188/170 |
| 4,022,298 A | 5/1977 | Malinowski | |
| 4,024,936 A * | 5/1977 | Crabb | 192/221 |
| 4,077,500 A * | 3/1978 | Hickman et al. | 188/106 P |
| 4,134,483 A * | 1/1979 | Horsch | 192/113.35 |
| 4,947,966 A * | 8/1990 | Huff | 188/170 |
| 5,469,943 A * | 11/1995 | Hill et al. | 188/264 F |
| 6,089,357 A * | 7/2000 | Jackson et al. | 188/71.6 |
| 6,152,269 A * | 11/2000 | Malvestio | 188/106 P |
| 6,189,669 B1 * | 2/2001 | Kremer et al. | 192/70.12 |
| 6,244,407 B1 * | 6/2001 | Kremer et al. | 192/70.12 |
| 7,980,365 B2 * | 7/2011 | Bayer et al. | 188/71.5 |

\* cited by examiner

BRAKE MECHANISM FOR A VEHICLE

BACKGROUND OF THE INVENTION

1. Field of Invention

The invention relates to a brake mechanism for a vehicle, in particular an agricultural utility vehicle.

2. Description of Related Art

In the case of agricultural utility vehicles, brake mechanisms are used which can comprise a service brake and a parking brake. These service brakes and parking brakes must, in operation, fulfil high performance requirements due to the heavy weight of the utility vehicles and the towing loads. The brake mechanisms, in the case of agricultural utility vehicles, are also provided on the output shaft in the drive train.

The output shaft here has a substantially higher rotational speed in comparison to a wheel speed. Therefore brake disks of the brake mechanism, which are arranged on the output shaft, and stationary brake disks, which are arranged on a rotationally-fixed housing of the brake mechanism, have a high rotational speed difference. Thus during a brake application, undesirably high heat can develop in the brake mechanism due to the friction between the brake disks.

This heat development can be counteracted for example with an annular piston brake, such as for example a cardan brake, integrated into a transmission, by cooling the brake disks. The brake disks are arranged in the brake mechanism in such a way that they are brought into contact with heat-dissipating oil. At the same time the oil quantity necessary for cooling the brake disks may, depending on the arising heat development, be controlled by a pump unit, such as for example a transmission pump. If the rotational speed of the output shaft is high, a larger quantity of oil for cooling the brake mechanism must be supplied by the transmission pump. This larger quantity of oil can only be made available by greater power of the transmission pump. However this increased power of the transmission pump reduces the utility vehicle power that is available overall in the utility vehicle. Therefore the utility vehicle power is affected inter alia by the power required by the transmission pump.

BRIEF SUMMARY OF THE INVENTION

The object of the present invention is therefore to provide a brake mechanism wherein better cooling of the brake mechanism with less utility vehicle power loss can be guaranteed.

According to the invention there is provided a brake mechanism with a rotationally-fixed housing, an output shaft rotatably arranged in the housing and brake elements for braking the output shaft, wherein the housing comprises a brake chamber provided with a control element and wherein said brake chamber is fluidically connected to a brake element chamber, the brake elements are arranged in the brake element chamber so that during a braking application oil is supplied to the brake chamber from an oil chamber arranged outside the housing, said housing provided with a recess which extends into an oil free part of the oil chamber.

Preferably, the recess is arranged above an oil bath formed inside the oil chamber.

Preferably the brake mechanism has an adjustable first control element which is formed and arranged so that during a brake application the brake chamber is fluidically connected to the oil chamber and the brake chamber is separate from the oil chamber.

More preferably the first control element is formed so that it is adjustable during a brake application by means of an actuating pressure so that it comes into contact with the brake elements and moves the brake elements into frictional contact with one another and wherein the brake chamber is fluidically connected to the oil chamber.

Preferably the brake chamber and the oil chamber are connected by an inlet manifold.

More preferably the oil chamber is permanently fluidly connected via a connecting element to the brake chamber.

More preferably the connecting element is formed as a notch on the first and/or second control element.

Preferably still the connecting element is formed as a hole connecting the inlet manifold and the brake chamber in the first and/or second control element.

The advantages gained by the invention are particularly that, additionally to the quantity of oil made available by the transmission pump, a further quantity of oil can be supplied to the brake mechanism from an oil chamber. Thus an altogether larger quantity of oil is available to the inventive embodiment for cooling the brake elements than in the case of the embodiment wherein the quantity of oil is supplied by the transmission pump alone. Thus undesirable heat development in the brake mechanism can also be better dissipated through the larger quantity of oil available. In fact the quantity of oil supplied from the oil chamber can exceed the quantity of oil supplied by the transmission pump, so that even a smaller, lower-powered transmission pump is sufficient. Due to the use of a smaller, lower-powered transmission pump the utility vehicle power losses caused by the transmission pump are also reduced.

A further advantage of the invention is that the additional quantity of oil supplied from the oil chamber can be controlled. Thus it can be guaranteed that, during a brake application, a larger quantity of oil is found inside a brake element chamber than in an operating condition in which the brake is not operated. Therefore the resistance caused by the oil in the brake element chamber against rotation of the brake disks, which partially extend into the oil bath of the brake element chamber, is also reduced. Thus the power losses (wheel drive losses) caused by this are reduced.

A further advantageous embodiment of the invention consists in the fact that a brake chamber is separated from an inlet manifold, which is connected to the oil chamber, by an adjustable first control element already present in the brake mechanism. Thus the brake mechanism must only be adapted so that for example in the housing of the brake mechanism an inlet opening, connecting the inlet manifold to the brake chamber, is provided. This inlet opening can be fabricated cost-effectively, for example when the housing is cast.

A further advantageous embodiment of the invention consists in the fact that for example a connecting element can be formed between the brake chamber and the oil chamber so that a constant oil supply to a brake chamber of the brake mechanism can be guaranteed. Thus it can be guaranteed, for example in emergency operation of the vehicle, during which a braking action is to take place via the parking brake alone, that the brake elements are sufficiently cooled.

BRIEF DESCRIPTION OF THE DRAWINGS

Details of the invention are described in more detail on the basis of the drawings in which there are shown.

DETAILED DESCRIPTION OF THE INVENTION

Figure 1:
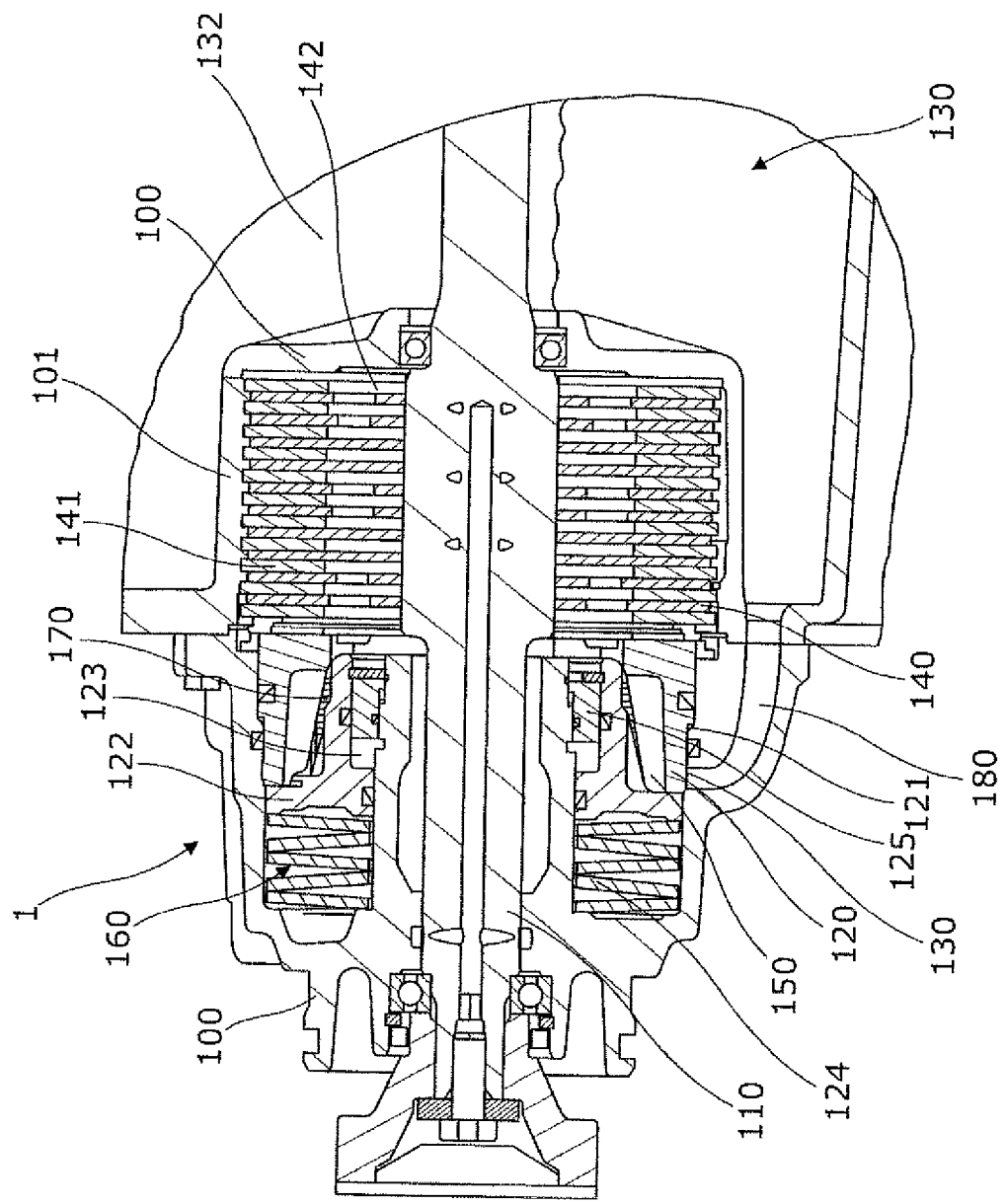
FIG. 1 a brake mechanism, wherein no brake applications takes place.

FIG. 1 shows a brake mechanism 1, wherein no brake operation takes place. The brake mechanism 1 comprises a stationary, non-rotating housing 100, which is arranged with one end in an oil chamber 130. The oil chamber 130 in this case is filled with oil only to a predetermined level. Additionally the oil chamber 130 is arranged for example in a gear unit of the utility vehicle, not illustrated in FIG. 1. Only one part of the housing 100 is in contact with the oil bath in the oil chamber 130. Moreover the housing 100 comprises a recess 101 which extends into the oil chamber 130. This recess 101 is arranged in an oil free part of the chamber 130 above the oil line of the oil bath formed inside the oil chamber 130.

A control area 160 and a brake element chamber 142 are formed inside the housing 100. Moreover a rotatable output shaft 110, which passes through the control area 160 and the brake element chamber 142, is arranged inside the housing 100. Brake elements 140, 141, which in this exemplary embodiment are formed as brake disks 140, 141, are arranged in the brake element chamber 142. At the same time the brake disks 140, 141 are fastened in each case alternating on the rotationally-fixed housing 100 and the output shaft 110. Moreover one end of the brake elements 140, 141 extends into an oil sump located in the brake element chamber 142.

A first and second control element 120, 122 are arranged in the control area 160. The first and second control element 120, 122, are each formed cylindrically, having a flange at one end in each case. Additionally a first spring element 124, which is coupled with a front side of the flange end of the second control element 122 and the housing 100, is arranged in the control area 160. However the flange end of the first control element 121 points with its front side towards the brake element chamber 142. A second spring element 170 is arranged between the first and second control element 120, 121. This second spring element 170 is formed as a tension spring for example.

In the case illustrated in FIG. 1 the first control element 120 is in contact with the second control element 122. The front side of the end of the first control element 120 turned away from the brake element chamber 142 touches the surface, pointing towards the first control element 120, of the flange end of the second control element 122. Moreover in this illustrated case, the front side of the flange end of the first control element 120 is not in contact with the brake elements 140, 141.

A first control chamber 121 is formed between the first control element 120 and the housing 100. Furthermore a brake chamber 150, which is fluidically connected to the brake element chamber 142, is formed between the first control element 120 and the second control element 122. Moreover a second control chamber 123 is formed between the second control element 122, the housing 100 and an annular element 125. The annular element 125 in this case is arranged on the housing and fixed against movement.

At the same time the first control chamber 121 forms with the first control element 120 part of a service brake. The second control chamber 123 forms with the second control element 122 and the first spring element 124 part of the parking brake.

Between a housing of the—not illustrated—gear unit and the housing 100 of the brake mechanism, an inlet manifold 180 is formed in the region of the oil bath. In addition the housing 100 has an inlet opening 190, via which the brake chamber 150 in this case can be fluidically connected to the inlet manifold 180. The brake chamber 150 in this case is fluidically connected to the oil chamber 130. The inlet opening 190 is located on the part of the housing 100, which extends into the oil bath, that is to say below the oil level. In a condition of the service brake in which no braking action is carried out by this, the inlet opening 190 is closed by a peripheral face of the first control element 120. Therefore no oil can flow via the inlet manifold 180 to the brake chamber 150 in this position of the first control element 120.

Axial movement of the first and/or second control element 120, 122 can be controlled in each case by means of the first and/or second control chamber 121, 123. In the case illustrated in FIG. 1 the actuating pressure prevailing in the second control chamber 123 is increased. Thus force is exerted on the second control element 122 towards the first spring element 124. Therefore the second control element 122 moves in this direction, as a result of which the first spring element 124 is compressed together. Moreover the actuating pressure prevailing in the first control chamber 121 is not increased in this case.

Due to the coupling of the first control element 120 with the second control element 122 via the second spring element 170, the first control element 120 is moved in the same direction as the second control element 121. In the case illustrated in FIG. 1 the inlet opening is thus closed by the first or second control element 120, 122. Therefore fluid present in the inlet manifold 180 cannot flow into the brake chamber 150.

The position of the control elements 120, 122 illustrated in FIG. 1 corresponds in this case to a position of the brake mechanism in which no braking action is to be exerted on the output shaft 110.

Figure 2:
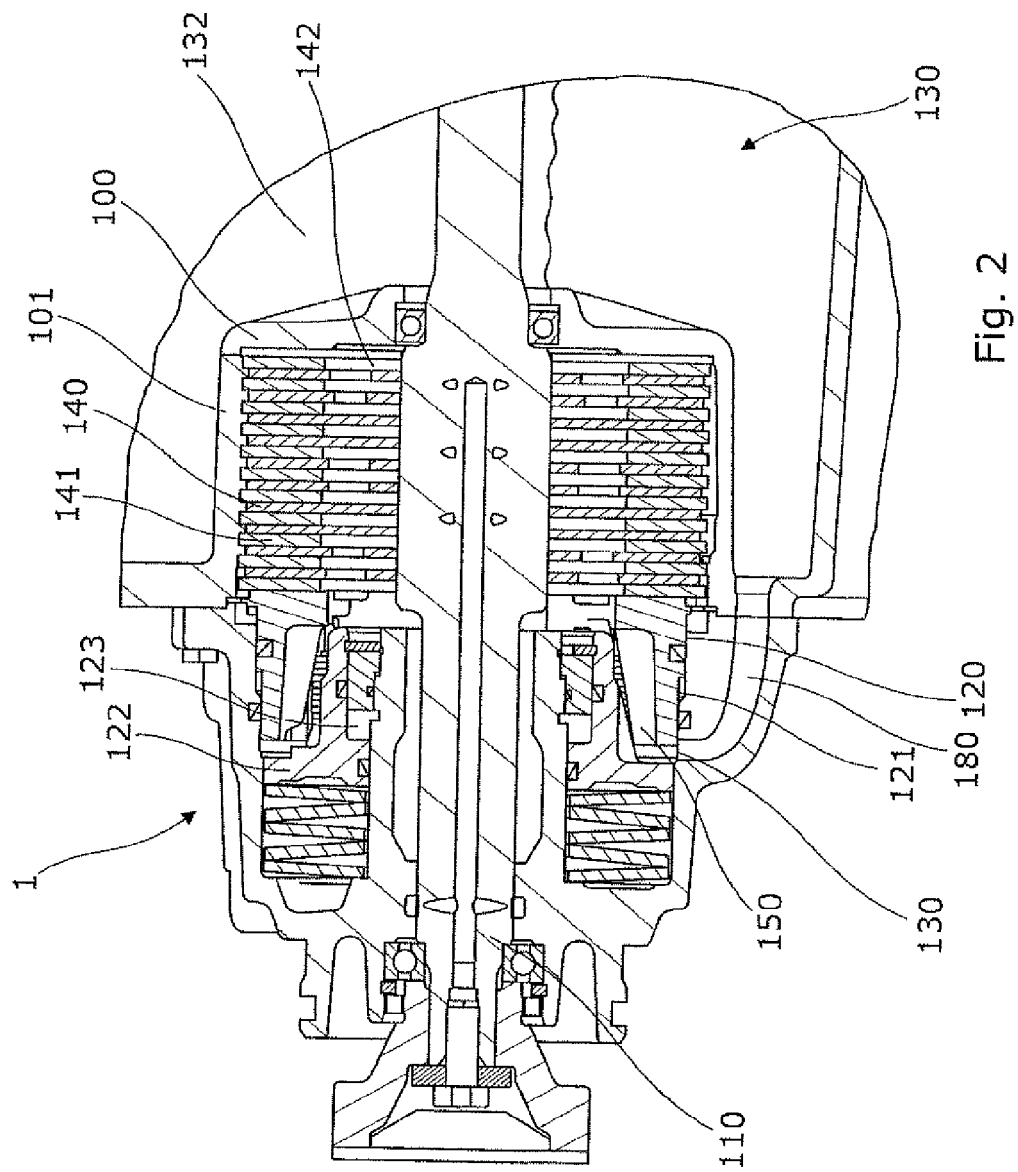
FIG. 2 a brake mechanism, wherein a brake application takes place.

FIG. 2 shows a brake mechanism wherein a braking action is effected by the service brake. During a desired braking action by the service brake, the first control element 120 moves towards the brake elements 140, 141 due to the increase in pressure of the first control chamber 121. This movement takes place so long as the first control element 120 is in contact with the brake elements 141, 140 and thus a braking action takes place on the output shaft 110. In this case the actuating pressure prevailing in the second control chamber 123 is increased, so that the second control element 122 does not move.

As a result of the movement of the first control element 120 towards the brake elements 140, 141, the inlet opening is no longer completely closed by the peripheral face of the first control element 120. Thus fluidic connection between the inlet manifold 180 and the brake chamber 150 is facilitated. Therefore oil can flow from the oil chamber 130 via the inlet manifold 180 to the brake chamber 150. Additionally the oil located in the brake chamber 150 continues to flow into the brake element chamber 142 and thus comes into contact with the brake elements 140, 141, as a result of which the brake elements 140, 141 are cooled. The oil in the brake element chamber 142 is ejected by rotation of the output shaft 110 and the second brake elements 140 arranged thereon via the recess 101 arranged in the housing 100.

This heated oil ejected from the brake mechanism 1 can be subsequently cooled through components, which are not illustrated in FIG. 2 and are arranged in an oil circuit.

After a brake application by the service brake, the actuating pressure prevailing in the first control chamber 121 is reduced. Consequently the first control element 120, due to the coupling with the second spring element 170, is moved towards the second control element 122.

During a braking action, not illustrated in FIGS. 1 and 2, by the parking brake, the actuating pressure prevailing in the second control chamber 123 is reduced as shown in FIG. 1. Therefore the second control element 122, due to the spring force exerted by the first spring element 124 on the flange end of the second control element 122, is moved towards the brake elements 140, 141. Since the second control element 122 is in contact with the first control element 121, the first control element 121 is also moved towards the brake elements 140, 141 accordingly. The control elements 120, 122 are moved so far until the first control element 121 is in contact with the brake elements 140, 141. In this case fluidic connection of the brake chamber 150 to the inlet manifold 180 is prevented by the control elements 120, 122.

Alternatively to the embodiments illustrated in FIGS. 1 and 2, independently of the position of the control elements 120, 122, a continuous oil supply from the inlet manifold 180 to the brake chamber 150 can be regulated. This could take place for example via a notch arranged in the first and/or second control element 120. Alternatively the quantity of oil that is supplied can be controlled via a hole connecting the inlet manifold 180 and the brake chamber 150. The hole in this case could be formed in the first and/or second control element 120, 121.

The invention claimed is:

1. A brake mechanism which is operable in a service brake mode and a parking brake mode, the brake mechanism comprising:
   an output shaft;
   brake elements for braking the output shaft;
   a rotationally-fixed housing, said output shaft rotatably arranged in the housing, the housing comprising a brake chamber and a brake element chamber housing said brake elements, the brake chamber being fluidically connected to the brake element chamber;
   a first control element in the brake chamber, said first control element being fluid pressure actuated;
   a second control element in the brake chamber, the second control element being biased by a first spring mechanism towards the first control element to move the first control element towards the brake elements to apply the brake mechanism in the parking mode;
   an oil chamber arranged outside the housing for holding a quantity of oil, said oil chamber comprising a manifold for the supply of oil to the brake chamber, the brake element chamber having an outlet recess which extends into an oil free part of the oil chamber, wherein the housing has an inlet opening connected to the oil chamber at a position located below an oil level which fluidically connects the manifold to the brake chamber;
   the brake mechanism being arranged so that:
      when applied in a service brake mode, the first control element is moved by actuating pressure towards the brake elements to move the brake elements into frictional engagement, said movement of the first control element opening the fluidic connection between the brake chamber and the oil chamber thus controlling the cooling of the brake elements, by pressurising a first control chamber partially defined by the first control element to move the first control element; and
      the parking brake mode is released by pressurising a second control chamber partially defined by the second control element which opposes the first spring mechanism and moves the second control element away from the brake elements.

2. A brake mechanism according to claim 1 wherein the brake chamber and the oil chamber are only fluidicallly connected when the first control element moves to engage the brake elements.

3. A brake mechanism according to claim 1 wherein the first control element comprises a notch or hole to provide a fluidic connection between the brake chamber and the oil chamber.

\* \* \* \* \*